(12) United States Patent
Funagi et al.

(10) Patent No.: US 7,220,477 B2
(45) Date of Patent: May 22, 2007

(54) FILM FOR LAMINATION AND LAMINATED MEMBER USING THE FILM

(75) Inventors: Yuji Funagi, Yokohama (JP); Kazuhiro Sato, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 10/549,041

(22) PCT Filed: Mar. 12, 2004

(86) PCT No.: PCT/JP2004/003352

§ 371 (c)(1),
(2), (4) Date: Sep. 15, 2005

(87) PCT Pub. No.: WO2004/083279

PCT Pub. Date: Sep. 30, 2004

(65) Prior Publication Data
US 2006/0199023 A1    Sep. 7, 2006

(30) Foreign Application Priority Data
Mar. 19, 2003   (JP) .............................. 2003-076195
Oct. 22, 2003   (JP) .............................. 2003-361803

(51) Int. Cl.
  *B32B 7/02*    (2006.01)
  *B32B 27/08*   (2006.01)
  *B32B 27/36*   (2006.01)
(52) U.S. Cl. ........................ 428/212; 428/213; 428/215; 428/216; 428/457; 428/458; 428/480
(58) Field of Classification Search ................ None
See application file for complete search history.

(56) References Cited

U.S. PATENT DOCUMENTS

| | | | |
|---|---|---|---|
| 4,145,466 A * | 3/1979 | Leslie et al. | 428/36.92 |
| 4,419,485 A * | 12/1983 | Borman et al. | 525/437 |
| 4,957,820 A * | 9/1990 | Heyes et al. | 428/623 |
| 5,446,111 A * | 8/1995 | Rotter et al. | 525/444 |
| 5,482,977 A * | 1/1996 | McConnell et al. | 521/81 |
| 5,801,206 A * | 9/1998 | Khemani et al. | 521/81 |
| 6,013,360 A * | 1/2000 | Al Ghatta et al. | 428/220 |
| 6,479,562 B2 * | 11/2002 | Ghatta et al. | 521/182 |
| 6,696,146 B1 * | 2/2004 | Al Ghatta et al. | 428/317.9 |
| 6,803,442 B2 * | 10/2004 | Fujimaki et al. | 528/272 |
| 2001/0020046 A1 * | 9/2001 | Ghatta et al. | 521/182 |

FOREIGN PATENT DOCUMENTS

JP      2001-200038      * 7/2001

* cited by examiner

*Primary Examiner*—Vivian Chen
(74) *Attorney, Agent, or Firm*—Sughrue Mion, PLLC (57) ABSTRACT

A film for lamination comprising a polyester resin containing a polyfunctional component in an amount of 0.01 to 0.50 mol % and having a melt tension of not smaller than 50 mN. Even when laminated on a metal plate by a high-speed extrusion lamination method, the film can be applied onto the metal plate maintaining a uniform thickness and good adhesiveness without undergoing oscillation or pulsation. Being blended with a copolymerizable component in an amount of 10 to 20 mol %, in particular, the laminated member coated with the film features excellent adhesiveness of the coating. By further laminating a layer of another polyester resin on the above film, the flavor-retaining property can be imparted as well.

8 Claims, 2 Drawing Sheets

FILM FOR LAMINATION AND LAMINATED MEMBER USING THE FILM

TECHNICAL FIELD

The present invention relates to a film of a polyester resin containing a polyfunctional component and to a laminated member coated with the film. More specifically, the invention relates to a film which can be laminated on a metal plate at a high speed and is capable of covering the metal plate maintaining excellent uniformity in the thickness and adhesiveness, and to a laminated member coated with the film which can be excellently worked.

BACKGROUND ART

As means for imparting corrosion resistance to metal materials, it has heretofore been widely attempted to coat the surfaces of metals with a resin layer. As coating methods used for this technology, further, there have been known a method of coating the surfaces of a metal with a solvent in which there has been dispersed a thermosetting resin such as epoxy resin, phenol resin, acrylic resin or polyester resin, and a method of sticking a film that has been formed in advance such as polyester film, olefin film or polyamide film onto a metal substrate via an adhesive such as isocyanate adhesive, epoxy adhesive or phenol adhesive.

It has further been widely known to utilize the heat-melting property of the thermoplastic resin for sticking the metal substrate and the thermoplastic resin together. For this purpose, there have been known a method of sticking a film that has been formed in advance using a thermoplastic polyester resin or the like onto a metal plate by heat-adhesion, and a method of sticking a thin molten film of a thermoplastic polyester resin that is extruded onto a metal plate.

The latter method of sticking onto the metal plate based on the extrusion lamination is capable of executing the treatment at a very high speed offering an advantage of decreasing the amount of work involved in the formation of films and decreasing the cost.

As the extrusion lamination method, there has generally been employed a T-die method using an extruder and a T-die. The T-die method, however, involves unstable flow in the extruder and in the die and, besides, an air gap exists to some extent between the T-die and the metal plate. When a generally employed polyester is used, therefore, the film oscillates and pulsates making it difficult to form a coating on the metal plate maintaining stability, uniform film thickness and good adhesion. These phenomena occurs particularly when the resin is taken up at an increased speed, making it very difficult to laminate the polyester resin at high speeds.

In order to solve the above-mentioned problems, there have been proposed various methods such as the one taught in JP-A-10-86308 filed by the present applicant, which discloses a laminate having a ratio of melt viscosities at a temperature of melt extrusion (melt viscosity $\eta_{12.2}$ at a temperature of extruding the polyester and at a preceding stage rate of 12.2 sec$^{-1}$/melt viscosity $\eta_{1216}$ at the temperature of extruding the polyester and at a shearing rate of 1216 sec$^{-1}$) of not smaller than 2.0, and a melt viscosity $\eta_{1216}$ of not smaller than 500 poises, wherein the resin layer is melt-extruded and is, then, quickly cooled, the polyester resin used therein containing an ethylene oxide adduct of bisphenol or a trifunctional or more functional polybasic acid and a polyhydric alcohol, the laminate exhibiting a suppressed draw resonance phenomenon and forming a coating having excellent homogeneity and adhesiveness relying upon a high-speed lamination.

JP-A-2001-72747 discloses a polyester having a melting point of not lower than 220° C. comprising chiefly an ethylene terephthalate containing a compound that has three or four ester bond-forming functional groups in an amount of 0.1 to 2.0 mol %, the polyester having a die swell ratio of not smaller than 1.3 as measured at a temperature of the melting point of the polyester plus 40° C. and exhibiting excellent extrusion workability.

DISCLOSURE OF THE INVENTION

However, the above film for lamination is not still satisfactory from the standpoint of adhesiveness to a metal blank, and it is desired to provide a coating having further improved adhesiveness.

Further, a polyester containing a polyfunctional component permits monomers and oligomers to remain therein arousing a problem in regard to flavor that is affected by the elution of the above components. Even the latter polyester in the above-mentioned prior arts requires a predetermined treatment for decreasing the monomers and oligomers.

It is therefore an object of the present invention to provide a film which can be applied onto a metal plate maintaining a uniform thickness and good adhesiveness without undergoing the above-mentioned oscillation or pulsation even when it is laminated on the metal plate by a high-speed extrusion lamination method.

Another object of the present invention is to provide a laminated member preventing low molecular components in the polyester from eluting out, exhibiting excellent flavor-retaining property, excellent uniformity and adhesiveness of the coating.

According to the present invention, there is provided a film for lamination comprising a polyester resin containing a polyfunctional component in an amount of 0.01 to 0.50 mol % and having a melt tension of not smaller than 50 mN.

In the film for lamination, it is desired that:
1. The polyester resin is a copolymerized polyester resin comprising chiefly a polyethylene terephthalate unit which contains a copolymerizable component in an amount of 10 to 20 mol %;
2. The copolymerizable component is an isophthalic acid;
3. The copolymerized polyester resin has a melting point of lower than 220° C.;
4. The polyester resin serves as a first polyester resin, a layer of a second polyester resin is laminated on the layer of the first polyester resin;
5. The melt tension of the first polyester resin is greater than the melt tension of the second polyester resin;
6. The ratio of the melt tensions of the first polyester resin and of the second polyester resin is 1.1:1 to 5:1; and
7. The ratio of the thicknesses of the first polyester resin and of the second polyester resin is 50:1 to 1:5.

According to the present invention, further, there is provided a laminated member obtained by laminating the above film on a metal substrate so as to come in contact therewith.

The film for lamination of the present invention comprises a copolymerized polyester resin containing a polyfunctional component in an amount of 0.01 to 0.50 mol % and having a melt tension of not smaller than 50 mN. Even when laminated on the metal substrate at a high speed, therefore, the film is prevented from oscillating or pulsating and is fed maintaining a uniform thickness onto the metal substrate. Upon containing the copolymerizable component in an amount of 10 to 20 mol %, in particular, there is provided a laminated member featuring excellent adhesiveness of the film onto the metal substrate.

That is, the polyester resin (polyethylene terephthalate), in general, has a low melt tension and a low melt viscosity. When extrusion-laminated on the metal substrate at a high speed, therefore, there occur a phenomenon called film oscillation in which the ends in the direction of width of the molten resin film extruded through the T-die oscillates and a phenomenon called pulsation in which the molten resin film extruded through the T-die develops irregularity in the thickness in the lengthwise direction, making it difficult to obtain a uniform film thickness and deteriorating the adhesiveness onto the metal substrate. On the other hand, an increase in the melt tension is accompanied by a conspicuous increase in the viscosity deteriorating the extrusion workability when an ordinary extruder is used and making it difficult to conduct the extrusion at a high speed.

From the above point of view, according to the present invention, the polyester resin contains a polyfunctional component in an amount of 0.01 to 0.50 mol % to introduce the polyfunctional component in the main chain of the polyester thereby to form a branched chain or a crosslinked chain to accomplish a melt tension of not smaller than 50 mN without excessively increasing the melt viscosity and, hence, to effectively prevent the occurrence of film oscillation or pulsation despite of carrying out the extrusion lamination at a high speed.

The above action and effect of the invention will be obvious even from the results of Examples described later. Namely, it will be understood that the films oscillate when a polyester resin without containing polyfunctional component and having a melt tension which is not larger than 50 mN (Comparative Example 1) and a polyester resin which contains the polyfunctional component in an amount lying within the above range but has a melt tension of not larger than 50 mN (Comparative Example 2) are extruded at a rate of 100 m/min. On the other hand, neither the film oscillation nor pulsation occurs when the polyester resins containing the polyfunctional components in amounts within the above range and having melt tensions of not smaller than 50 mN (Examples 1 to 4) are extruded, and excellent high-speed lamination performance is realized when the polyester resin contains the polyfunctional component in an amount of 0.01 to 0.50 mol % and has the melt tension of not smaller than 50 mN.

It has been desired to further improve the adhesiveness of the film of the above polyester film-laminated member. According to the present invention, in particular, it is desired to use, as the polyester resin, a copolymerized polyester resin containing an isophthalic acid as a copolymerizable component in an amount of 10 to 20 mol %. This makes it possible to greatly improve the adhesiveness of the film onto the metal substrate. According to the present invention, in particular, it is desired that the amount of the copolymerizable component is so adjusted that the melting point of the copolymerized polyester resin is lower than 220° C. and, particularly, in a range of 200 to 219° C. from the standpoint of improving the adhesiveness of the film as well as the heat resistance and workability thereof.

The above action and effect of the present invention will become obvious from the results of Examples appearing later. That is, when the copolymerized polyester resin contains the isophthalic acid in amounts within the above range (Examples 1 to 4), the film exhibits excellent adhesiveness. When the polyester resin is not quite blended with the isophthalic acid (Comparative Example 3) or when the copolymerized polyester contains the isophthalic acid in an amount smaller than the above range (Comparative Example 4), it is obvious that the film exhibits adhesiveness inferior to that of when the amount of the isophthalic acid lies within the above range. When the copolymerized polyester resin contains the isophthalic acid in an amount greater than the above range (Comparative Example 5), on the other hand, decreased heat resistance is exhibited. It will, therefore, be understood that the amount of the isophthalic acid lying within the above range is important for satisfying both the adhesiveness and the heat resistance.

The polyester resin (first polyester resin) containing the polyfunctional component polymerizes at a high rate and permits monomers and oligomers to remain therein. Elution of these low molecular components arouses a problem of affecting the flavor. According to the present invention, the second polyester resin without containing such low molecular components is laminated on the first polyester resin layer to form a multi-layer film making it possible to prevent the deterioration of flavor caused by low molecular components eluted from the first polyester resin layer.

That is, extrusion lamination of the multi-layer film at a high speed is improved by using the first polyester resin, and the deterioration of flavor caused by the use of the first polyester resin is prevented by using the second polyester resin layer, making it possible to provide a multi-layer film exhibiting all of the properties that should be possessed by the multi-layer film as a whole.

In the multi-layer film of the present invention, it is desired that the melt tension of the first polyester resin is greater than the melt tension of the second polyester resin. That is, owing to the presence of the polyfunctional component, the first polyester resin is capable of exhibiting the melt tension of not smaller than 50 mN without increasing the melt viscosity in the extruder. When the melt tension of the second polyester resin is greatly increased, however, the melt viscosity becomes too high due to a correlation between the melt tension and the melt viscosity, exerting an excess of load on the extruder and making it difficult to effect the extrusion.

In the present invention, further, it is particularly desired that the ratio of the melt tensions of the first polyester resin and of the second polyester resin is in a range of 1.1:1 to 5:1 and, particularly, 1.5:1 to 3:1. That is, when the difference in the melt tension between the first polyester resin and the second polyester resin is great and, particularly, when the ratio thereof is greater than the above range, the laminate that is extruded at a high speed may pulsate. When the ratio thereof is smaller than the above range, the melt viscosity of the second polyester resin becomes too high, and an excess of load is exerted on the extruder as described above making it difficult to effect the extrusion.

It is desired that the ratio of the thicknesses of the first polyester resin and of the second polyester resin is in a range of 50:1 to 1:5 and, particularly, 10:1 to 1:1. When the ratio of the thicknesses is within the above range, it is allowed to accomplish both the extrusion lamination at high speeds and the flavor-retaining property maintaining good balance.

The laminated member is coated with the film for lamination of the present invention which features uniform film thickness and excellent adhesiveness, and can be excellently worked enduring severe workings such as draw working, draw/deep-draw working, draw/ironing working, or draw/bend elongation/ironing working.

BEST MODE FOR CARRYING OUT THE INVENTION (First Polyester Resin)

The polyester resin used as the first polyester resin for forming a single-layer film for lamination and a multi-layer film for lamination of the present invention contains a polyfunctional component in an amount of 0.01 to 0.50 mol % and, particularly, 0.05 to 0.40 mol %, and there can be used any known polyester resin comprising a dicarboxylic acid component and a diol component if the melt tension which is not greater than 50 mN is not taken into consideration.

That is, by introducing the polyfunctional component which is three-functional or more highly functional into the main chain of the polyester to form a branched chain or a crosslinked chain, the melt tension can be adjusted to be not smaller than 50 mN.

As for the dicarboxylic acid component, it is desired that not less than 50% and, particularly, not less than 80% of the dicarboxylic acid component is a terephthalic acid from the standpoint of mechanical properties and thermal properties of the coating. A carboxylic acid component other than the terephthalic acid may be contained as a matter of course. As the carboxylic acid component that is a copolymerizable component other than the terephthalic acid, there can be exemplified naphthalenedicarboxylic acid, p-β-oxyethoxybenzoic acid, biphenyl-4,4'-dicarboxylic acid, diphenoxyethane-4,4'-dicarboxylic acid, 5-sodiumsulfoisophthalic acid, hexahydroterephthalic acid, adipic acid and sebacic acid.

As for the diol component, it is desired that not less than 50% and, particularly, not less than 80% of the diol component is an ethylene glycol from the standpoint of mechanical properties and thermal properties of the coating. As the diol component other than the ethylene glycol, there can be exemplified 1,4-butanediol, propylene glycol, neopentyl glycol, 1,6-hexylene glycol, diethylene glycol, triethylene glycol, cyclohexanedimethanol, ethylene oxide adduct of bisphenol A, glycerol and trimethylolpropane.

The polyfunctional components are three-functional or more highly functional polybasic acids and polyhydric alcohols, i.e., polybasic acids such as trimellitic acid, pyromellitic acid, hemimellitic acid, 1,1,2,2-ethanetetracarboxylic acid, 1,1,2-ethanetricarboxylic acid, 1,3,5-pentanetricarboxylic acid, 1,2,3,4-cyclopentanetetracarboxylic acid, and biphenyl-3,4,3',4'-tetracarboxylic acid, and polyhydric alcohols such as pentaerythritol, glycerol, trimethylolpropane, 1,2,6-hexanetriol, sorbitol, and 1,1,4,4-tetrakis(hydroxymethyl)cyclohexane. Among them, the trimellitic acid is most preferably used.

It is desired that the content of the polyfunctional component is 0.01 to 0.50 mol % and, particularly, 0.05 to 0.40 mol % per the polyester. When the content of the polyfunctional component is smaller than the above range, it becomes difficult to increase the melt tension to be not smaller than 50 mN, and the laminate extruded at a high speed cannot be effectively prevented from oscillating or pulsating. When the content of the polyfunctional component is greater than the above range, on the other hand, the melt extrusion properties decrease, and the coating exhibits decreased mechanical properties and heat resistance.

The polyester resin blended with the polyfunctional component used in the present invention may be a homopolyester, a copolymerized polyester, or a blend of two or more kinds thereof. Most desirably, however, there is used a copolymerized polyester comprising chiefly an ethylene terephthalate unit which contains, as a copolymerizable component, an isophthalic acid in an amount of 10 to 20 mol % and, particularly, 11 to 17 mol %, wherein not less than 50% and, particularly, not less than 80% of the remaining acid component is a terephthalic acid, and not less than 50% and, particularly, not less than 80% of the alcohol component is an ethylene glycol. By using the isophthalic acid as a dicarboxylic acid component, the melting point and the crystallinity decrease, and the adhesion, i.e., adhesiveness to the metal substrate can be improved.

From the standpoint of properties of the coating and the melt extrusion properties thereof, it is desired that the polyester resin of the present invention has an inherent viscosity in a range of 0.5 to 2.0 dL/g and, particularly, 0.6 to 1.5 dL/g as measured by using a mixed solvent of phenol and tetrachloroethane.

To satisfy the adhesiveness of the film, heat resistance, workability and melt-extrusion properties, further, it is desired that the polyester resin has a melting point (Tm) of lower than 220° C. and, particularly, 200 to 219° C. It is further desired that its glass transition point is not lower than 30° C. and, particularly, in a range of 50 to 120° C.

The polyester resin layer used in the present invention may be blended with blending agents for resins that have been known per se., i.e., an anti-blocking agent such as amorphous silica, a pigment such as titanium dioxide (titanium white), an anti-oxidizing agent, a stabilizer, various anti-static agents and a lubricant according to a known recipe.

(Second Polyester Resin)

The multi-layer film of the invention is obtained by laminating a second polyester resin on a first polyester resin which is the above polyester resin. Here, the second polyester resin has such a relationship to the first polyester resin layer that its melt tension is smaller than that of the first polyester resin, and the ratio of the melt tensions thereof is from 1.1:1 to 5:1.

Concretely, there can be used a known polyester resin comprising the dicarboxylic acid component and the diol component exemplified concerning the first polyester resin. Here, however, the second polyester resin layer exhibits the flavor-retaining property in the multi-layer film, and is, particularly desirably, a polyester comprising chiefly an ethylene terephthalate in which not less than 80% of the dicarboxylic acid component is a terephthalic acid and not less than 80% of the diol component is an ethylene glycol.

From the standpoint of properties of the coating and the melt extrusion properties thereof, further, it is desired that the second polyester resin has an inherent viscosity in a range of 0.5 to 2.0 dL/g and, particularly, 0.6 to 1.5 dL/g as measured by using a mixed solvent of phenol and tetrachloroethane. From the standpoint of heat resistance, workability and melt extrusion properties, further, it is desired that the second polyester resin has a melting point (Tm) of 160 to 270° C. and, particularly, 200 to 260° C. It is further desired that its glass transition point is not lower than 30° C. and, particularly, in a range of 50 to 120° C.

Like the first polyester resin layer, the second polyester resin layer, too, may be blended with the above-mentioned widely known blending agents for resins according to a known recipe.

(Metal Substrate)

As the metal substrate on which the above film is to be laminated according to the present invention, there can be used a variety of surface-treated steel plates, a light metal plate such as of aluminum or a foil thereof.

As the surface-treated steel plate, there can be used the one obtained by subjecting the cold-rolled steel plate to the annealing and temper-rolling or to the secondary cold-rolling, i.e., the SR material and the DR material treated for their surfaces with one or two or more kinds of zinc plating, tin plating, nickel plating, electrolytic chromate and chromate. A preferred example of the surface-treated steel plate is an electrolytic chromate-treated steel plate and, particularly, the one having a metal chromium layer in an amount of 10 to 200 mg/m$^2$ and a chromium oxide layer in an amount of 1 to 50 mg/m$^2$ (calculated as metal chromium) featuring excellent film adhesion and corrosion resistance in combination. Another example of the surface-treated steel plate is a hard tin plate plated with tin in an amount of 0.6 to 11.2 g/m$^2$. It is desired that the tin plate is treated with chromate or chromate/phosphate such that the amount of chromium is 1 to 30 mg/m$^2$ calculated as metal chromium. As a further example, there can be used a steel plate coated with aluminum, such as the one plated with aluminum or pressure-welded with aluminum.

As the light metal plate, there can be used an aluminum alloy plate in addition to the so-called pure aluminum plate. The aluminum alloy plate featuring corrosion resistance and workability has a composition comprising 0.2 to 1.5% by weight of manganese, 0.8 to 5% by weight of magnesium, 0.25 to 0.3% by weight of zinc, and 0.16 to 0.26% by weight of copper, the remainder being aluminum. It is desired that the light metal plate, too, is treated with chromate or chromate/phosphate such that the amount of chromium is 20 to 300 mg/m$^2$ calculated as metal chromium.

The thickness of the metal plate may vary depending upon the kind of metal, use of the laminated member and the size thereof, but is, generally, 0.10 to 0.50 mm. Particularly, the thickness is 0.10 to 0.30 mm in the case of the surface-treated steel plate and is 0.15 to 0.40 mm in the case of the light metal plate.

When the film of the present invention is to be laminated on the metal substrate by the extrusion lamination method, there is no need of particularly providing an adhesive primer on the metal substrate in advance since the film of the invention can be excellently adhered onto the metal substrate. As desired, however, the adhesive primer may be provided thereon.

The primer exhibits excellent adhesiveness to both the metal substrate and the polyester resin. A representative example of the primer coating material having excellent adhesiveness and corrosion resistance is a phenol epoxy coating material comprising a resole-type phenolaldehyde resin derived from various phenols and a formaldehyde, and a phenol epoxy-type coating material of a bisphenol-type epoxy resin, and, particularly, the one containing the phenol resin and the epoxy resin at a weight ratio of 50:50 to 5:95 and, particularly, at a weight ratio of 40:60 to 10:90. It is desired that the adhesive primer layer is formed, usually, maintaining a thickness of 0.3 to 5 µm.

(Laminated Material)

The laminated member of the present invention is obtained by coating the metal substrate with the film of the present invention, i.e., by coating the metal substrate with a multi-layer film comprising a laminate of a single-layer film of the first polyester resin and another polyester resin (including the second polyester resin) on the single-layer film, the layer of the first polyester resin being in contact with the metal substrate.

When the laminated member of the present invention is formed into a can or a can end, it is necessary that the film of the invention is formed on at least the surface that becomes the inside of the can or the can end. It is allowable to laminate the film 5 of the present invention even on the outer surface, as a manner of course.

In the case of the multi-layer film comprising a layer of the first polyester resin and a layer of the second polyester resin, it is important that the layer of the first polyester resin is laminated on the side of the metal substrate from the standpoint of flavor-retaining property. When not formed on the inner surface of the container or the like, however, the multi-layer film may be so laminated that the layer of the first polyester resin becomes the surface layer.

Most desirably, the film formed on the film of the first polyester resin is the one of the above-mentioned second polyester resin, which, however, is not to exclude the film of any other thermoplastic resin.

Figure 1:
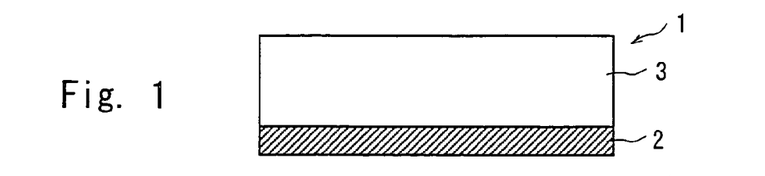
FIG. 1 is a view illustrating a sectional structure of a laminated member of the present invention.

FIG. 1 is a sectional view illustrating the structure of the laminated member of the present invention. The laminated member 1 shown in FIG. 1 has a film 3 of the first polyester resin formed on a metal substrate 2.

Figure 2:
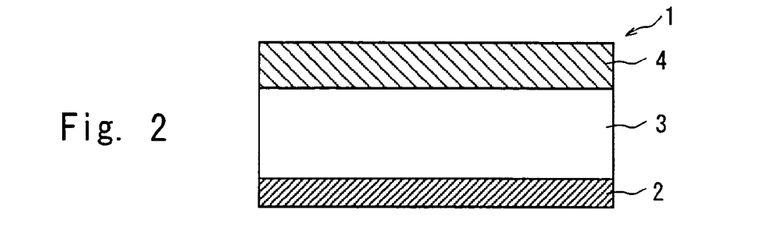
FIG. 2 is a view illustrating a sectional structure of a laminated member of the present invention.

A laminated member 1 shown in FIG. 2 has a film 4 of the second polyester resin formed on a film 3 of the first polyester resin on one surface of the metal substrate 2.

Figure 3:
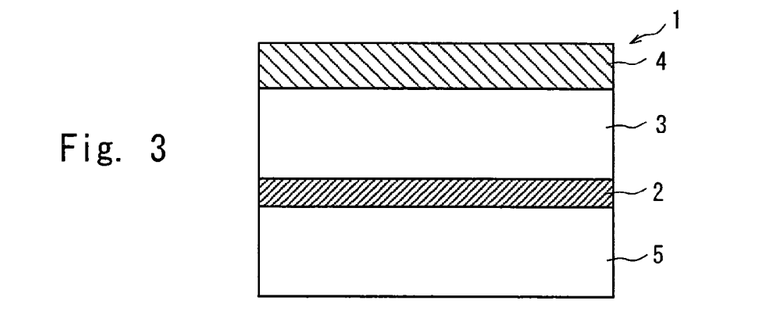
FIG. 3 is a view illustrating a sectional structure of a laminated member of the present invention.

A laminated member 1 shown in FIG. 3 has a film 4 of the second polyester resin formed on a film 3 of the first polyester resin on one surface of the metal substrate 2 and, further, has a film 5 of the first polyester resin on the other surface thereof.

Figure 4:
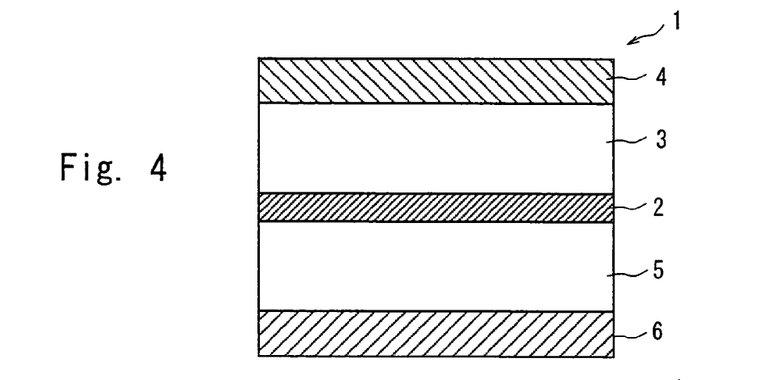
FIG. 4 is a view illustrating a sectional structure of a laminated member of the present invention.

A laminated member 1 shown in FIG. 4 has layers 3, 5 of the first polyester resin and layers 4, 6 of the second polyester resin formed on both surfaces of the metal substrate 2.

Figure 5:
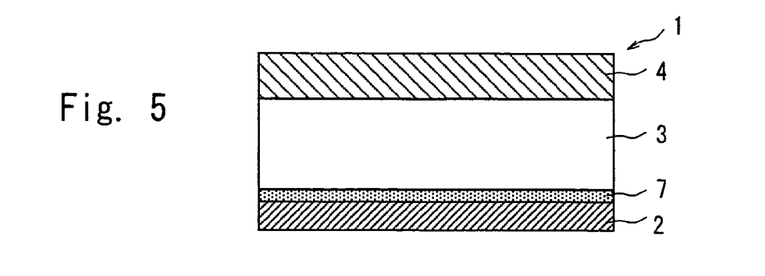
FIG. 5 is a view illustrating a sectional structure of a laminated member of the present invention.

A laminated member 1 shown in FIG. 5 is the same as that shown in FIG. 1 except that an adhesive resin layer 7 is formed between the layer 3 of the first polyester resin and the metal substrate 2.

(Laminating Method)

The film of the present invention can be formed by extrusion, such as a T-die method or an inflation film-forming method. In the case of a multi-layer film further forming, as an upper layer, a film of another polyester resin, the individual resins are melt-kneaded by using the extruders of a number that corresponds to the kinds of the resins relying upon a co-extrusion forming method in the same manner as the ordinary T-die method or the inflation method but using a multi-layer multiplex die and, thereafter, the resins are extruded into the multi-layer film through the T-die or the annular die. It is also allowable, as a matter of course, to form the films of the resins by the extrusion forming such as the T-die method or the inflation film-forming method, and adhering and laminating them together.

The film can be used as an undrawn film obtained by the cast-forming method which quickly cools the extruded film. The film can be further sequentially drawn or simultaneously drawn biaxially at a drawing temperature, and the film after drawn can be thermally fixed so as to be used as a biaxially drawn film.

The laminated member having the film of the invention laminated on the metal substrate can be formed by laminating the above-mentioned film of the first polyester resin or, as required, by laminating the multi-layer film further having the layer of the second polyester resin formed on the above film, on the metal substrate by a conventional laminating method such as dry lamination method. As described above, however, the film of the present invention can be excellently extrusion-laminated at a high speed and is, particularly desirably, laminated by the extrusion lamination method that will be described below. This makes it possible to conduct the treatment at a very high speed while decreasing the work and cost required for the production of the film such as taking up the film.

Next, the extrusion lamination method that can be favorably used for the laminated member of the present invention will be described concerning a case of forming a laminated member by forming a layer of another polyester resin on the layer of the copolymerized polyester resin.

Figure 6:
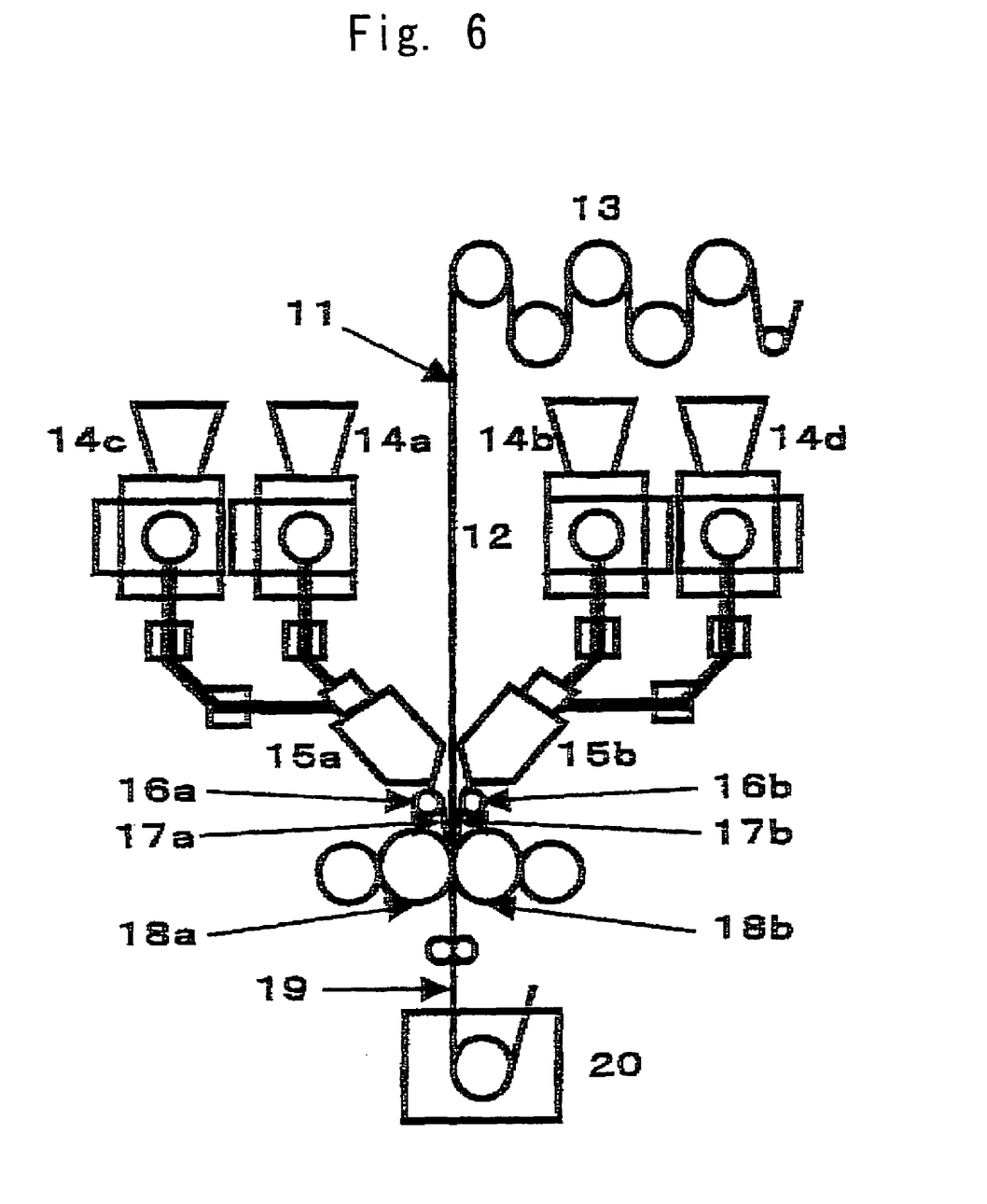
FIG. 6 is a diagram of an apparatus for producing a laminated member of the present invention.

Reference is made to FIG. 6 illustrating the arrangement of an apparatus used for the extrusion lamination method. Along a passage 12 of a metal substrate 11, there are arranged a heating zone 13 for heating the metal substrate, a pair of multi-layer multiplex dies 15a and 15b for feeding films from extruders 14a, 14b of the first copolymerized polyester resin and from extruders 14c, 14d of the second polyester resins arranged in an opposing manner on both sides of the metal substrate passage 12, pre-rolls 16a and 16b for receiving the films extruded from the dies 15a and 15b from the side opposite to the side of adhesion to the metal substrate 11 (from the side of the second polyester resin) over the full width of the films, a pair of laminate rolls 18a and 18b for receiving the films 17a and 17b from the pre-rolls 16a and 16b and for adhering the first polyester resins 14a, 14b and the second polyester resins 14c, 14d onto both surfaces of the metal substrate 11, and quickly cooling means 20 for quickly cooling the laminated member 19 that is formed.

The apparatus shown in FIG. 6 forms a lower layer of the first polyester resin and an upper layer of the second polyester resin on both surfaces of the metal substrate. It is, of course, allowable to form the first polyester resin layer on one surface only of the metal substrate and to form a layer of the second polyester resin thereon as an upper layer. In this case, either one of the die may not be used.

In the apparatus shown in FIG. 6, the metal substrate 11 is passed between the pair of laminate rolls 18a and 18b in a direction nearly at right angles with the line connecting the centers of the laminate rolls 18a and 18b, the molten films of the polyester resins from the dies 15a and 15b are received by the pre-rolls 16a and 16b, are supported and carried by the corresponding laminate rolls 18a and 18b, are fed to a nipping position 21 between the laminate rolls, and the multi-layer films 17 of the polyester resins are simultaneously melt-adhered onto both surfaces of the metal substrate 11.

This prevents a drop in the performance of the metal substrate and of the polyester resins caused by excess of heating, enables both surfaces of the metal substrate to be simultaneously coated with the polyester resins, cools the resin films yet maintaining a resin temperature by the pre-rolls necessary for the adhesion to the metal substrate, prevents the oscillation of films and excessive necking at the time of extrusion lamination, and improves the yield of the products without decreasing the width of the films in the flat portions. It is, further, made possible to produce, at a high speed, the laminated member having polyester resin coatings of a decreased thickness yet having high performance, i.e., having uniform thickness featuring high workability, high adhesiveness and high coating properties.

In producing the laminated member by using the apparatus shown in FIG. 6, the metal substrate 11 heated in the heating zone 13 is guided to a nipping position of the laminate rolls 18a and 18b. Here, since the metal substrate passage 2 and the laminate rolls 18a, 18b are provided maintaining the above-mentioned positional relationship, the metal substrate 11 is prevented from coming in contact with any other member until it arrives at the nipping position 21 of the laminate rolls 18 and 18b, and the temperature on the surface of the metal substrate 11 drops at the slowest rate corresponding to the rate of cooling of when it is left to stand in the air.

Therefore, the temperature and the heat capacity possessed by the metal substrate can be effectively utilized for melt-adhesion to the thin polyester resin film, and a high adhering strength is accomplished between the polyester resin film 17 and the metal substrate 11 without requiring the re-heating.

The resin-metal laminated member discharged from the laminate rolls is guided into the quickly cooling means and is quickly cooled to obtain the laminated member having a thin resin coating yet maintaining high performance, i.e., having uniform thickness, high workability, high adhesiveness and high film coating properties.

(Can Body and Can End)

Owing to the uniformity, adhesiveness of the coating and excellent workability, the laminated member of the present invention can be effectively utilized, particularly, for the can bodies and can ends. In particular, it is desired that the film of the above-mentioned polyester resin is so formed as to be at least on the insides of the can bodies and can ends.

The above-mentioned laminated member can be formed into two-piece cans and three-piece cans according to a conventional forming method.

Particularly desirably, the cans are seamless without seam on the side surface, and are produced by such means as draw working, draw/deep-draw working, draw/ironing working, or draw/bend-elongation working/ironing working. It is desired that the thickness of the side wall is decreased to be 20 to 95% and, particularly, 30 to 85% of the initial thickness of the resin-coated metal plate based on the bend-elongation by draw/redraw working or, further, based on the ironing of the resin-coated metal plate.

The can ends, too, can be formed by using the above laminated member relying upon a conventional method of producing the can ends.

The shape of the can end may be that of the conventional shape such as an easy-open end provided with a score for forming an opening for pouring out the content and a tab for opening.

EXAMPLES

The invention will now be described by way of Examples.

The characteristic values of the invention are measured according to the following measuring methods.

(1) Melting Point (Tm).

By using a differential scanning calorimeter DSC7 (manufactured by Perkin-Elmer Co.), about 5 mg of the resin was heated at a rate of 10° C./min. in a nitrogen stream, and a maximum temperature of the endothermic peak at the melting of crystals was regarded to be Tm.

(2) Inherent Viscosity (IV).

The resin was dissolved in a mixed solvent of phenol and tetrachloroethane at a weight ratio of 1:1, and was measured for its inherent viscosity at 30° C. by using the Ubbelohde's viscometer.

(3) Melt Tension.

The resin was fed into a segment biaxial extruder 2D25W manufactured by Toyo Seiki Saisakusho Co., and was melt extruded at a blow-out rate of 1.5 kg/hr at a resin temperature of 240° C. The molten resin from a strand die of L/D=15 mm/3 mm was taken out in an atmosphere of 25° C. at a rate of 100 m/min., and was measured for its melt tension by using a load cell at a position 450 mm away from the die outlet.

(4) High-Speed Lamination.

By using a T-die biaxial extruder shown in FIG. 4, the resin melted at 260° C. was extruded at 100 m/min. and was laminated onto an aluminum alloy plate to confirm the occurrence of film oscillation and pulsation. The criteria of evaluation were as follows:

[Film Oscillation]

Evaluated as a ratio of the width of the film oscillation to the width of the resin coating.

Smaller than 2% - - - ○

Not smaller than 2% - - - X

[Pulsation]

The resin coating of the obtained laminated member was measured for its thickness over a length of 500 mm in the lengthwise direction, and was evaluated as a ratio of the oscillating width of the measured thickness to the average thickness of the resin coating.

Smaller than 10% - - - ○

Not smaller than 10% - - - X (5) Aptitude for Producing the Cans.

A resin-coated aluminum alloy plate obtained by the extrusion lamination was DI-formed into a 350-ml can having an inner diameter of 66 mm and a height of 122 mm to evaluate the workability and the adhesiveness on the following basis. The can was DI-formed by drawing the resin-coated aluminum alloy plate applied with a lubricant, followed by re-drawing in a dry state and three stages of ironing.

[Workability]

Evaluated depending on the breakage of the body wall and the occurrence of buckling during the production of cans.

Cans were produced without breaking the body walls and without causing the buckling - - - ○

Body walls were broken or buckling occurred - - - X

[Adhesiveness]

Peeling and floating of films at the time of producing the cans were evaluated by eyes.

Films were not peeled or did no float - - - ○

Films were peeled off or floated - - - X (6) Flavor-Retaining Property.

Cans with good can production aptitude were filled with ultra-pure water, retort-treated (at 125° C. for 30 minutes), opened, and were functionally evaluated for differences in taste, turbidity and flavor before and after the retort-treatment.

No difference was recognized - - - ○

Difference was recognized - - - X

Example 1

A polyester resin comprising chiefly an ethylene terephthalate containing a polyfunctional component and a copolymerizable component in amounts as shown in Table 1 was fed to extruders of a diameter of 65 mm each equipped with an extrusion lamination facility, and was melt-extruded at a temperature higher by 30° C. than the melting point of the resin maintaining a thickness of 16 µm onto an aluminum alloy plate (A3004H19) having a thickness of 0.280 mm heated at 250° C. so as to be laminated on both surfaces of the aluminum alloy plate.

Characteristic values of the resin and the evaluated results were as shown in Tables 1 and 2. The films were neither oscillated nor pulsated at 100 m/min., and could be favorably laminated. The aptitude for producing the cans was good.

Examples 2 to 4

The procedure was conducted in the same manner as in Example 1 but using the polyfunctional components and the copolymerizable components in amounts as shown in Table 1. Characteristic values of the resins and the evaluated results were as shown in Tables 1 and 2.

The films were neither oscillated nor pulsated at 100 m/min., and could be favorably laminated. The aptitude for producing the cans was good.

Comparative Example 1

The procedure was conducted in the same manner as in Example 1 but using the polyfunctional component and the copolymerizable component in amounts as shown in Table 1. Characteristic values of the resin and the evaluated results were as shown in Tables 1 and 2.

Since the polyester resin contained no polyfunctional component, the melt tension was low and the film oscillated vigorously at 100 m/min. Therefore, the thickness of the coating resin on the laminated member was irregular, and the body walls were broken during the production of the cans.

Comparative Example 2

The procedure was conducted in the same manner as in Example 1 but using the polyfunctional component and the copolymerizable component in amounts as shown in Table 1. Characteristic values of the resin and the evaluated results were as shown in Tables 1 and 2.

Though the polyester resin contained the polyfunctional component, the melt tension was low and the film oscillated vigorously at 100 m/min. Therefore, the thickness of the coating resin on the laminated member was irregular, and the body walls were broken during the production of the cans.

Comparative Example 3

The procedure was conducted in the same manner as in Example 1 but using the polyfunctional component and the copolymerizable component in amounts as shown in Table 1. Characteristic values of the resin and the evaluated results were as shown in Tables 1 and 2.

The polyester resin could be favorably applied at a high speed. However, since the polyester resin contained no copolymerizable component, the films were peeled off and floated during the production of the cans.

Comparative Example 4

The procedure was conducted in the same manner as in Example 1 but using the polyfunctional component and the copolymerizable component in amounts as shown in Table 1. Characteristic values of the resin and the evaluated results were as shown in Tables 1 and 2.

The polyester resin could be favorably applied at a high speed. However, since the polyester resin contained the copolymerizable component at a too low concentration, the films were peeled off and floated during the production of the cans.

Comparative Example 5

The procedure was conducted in the same manner as in Example 1 but using the polyfunctional component and the copolymerizable component in amounts as shown in Table 1. Characteristic values of the resin and the evaluated results were as shown in Tables 1 and 2.

The polyester resin could be favorably applied at a high speed. However, since the polyester resin contained the copolymerizable component at a too high concentration, the melting point dropped greatly, the heat resistance was poor, and the punch could not be smoothly removed and the buckling occurred during the production of the cans.

Example 5

A first polyester resin comprising chiefly an ethylene terephthalate unit containing a trimellitic acid as a polyfunctional component and an isophthalic acid as a copolymerizable component in amounts as shown in Table 3, and a second polyester resin comprising chiefly an ethylene terephthalate unit containing an isophthalic acid component as a copolymerizable component in an amount as shown in Table 3, were fed to the extruders of a diameter of 65 mm each equipped with an extrusion lamination facility, and were melt-extruded at a temperature higher by 30° C. than the melting point of the resin maintaining a thickness of 16 µm onto an aluminum alloy plate (A3004H19) having a thickness of 0.280 mm heated at 250° C. so as to be laminated on both surfaces of the aluminum alloy plate.

The evaluated results were as shown in Table 4. The films were neither oscillated nor pulsated at 100 m/min., and could be favorably laminated. The aptitude for producing the cans and flavor-retaining property were good.

Example 6

The procedure was conducted in the same manner as in Example 5 but using the polyfunctional component and the copolymerizable component in the first polyester resin and using the copolymerizable component in the second polyester resin in amounts as shown in Table 3.

The evaluated results were as shown in Table 4. The films were neither oscillated nor pulsated at 100 m/min., and could be favorably laminated. The aptitude for producing the cans and flavor-retaining property were good.

Example 7

The procedure was conducted in the same manner as in Example 5 but using the polyfunctional component and the copolymerizable component in the first polyester resin and using the copolymerizable component in the second polyester resin in amounts as shown in Table 3.

The evaluated results were as shown in Table 4. The films were neither oscillated nor pulsated at 100 m/min., and could be favorably laminated. The aptitude for producing the cans and flavor-retaining property were good.

Example 8

The procedure was conducted in the same manner as in Example 5 but using the polyfunctional component and the copolymerizable component in the first polyester resin and using the copolymerizable component in the second polyester resin in amounts as shown in Table 3.

The evaluated results were as shown in Table 4. The films were neither oscillated nor pulsated at 100 m/min., and could be favorably laminated. The aptitude for producing the cans and flavor-retaining property were good.

Comparative Example 6

The procedure was conducted in the same manner as in Example 5 but using the polyfunctional component and the copolymerizable component in the first polyester resin and using the copolymerizable component in the second polyester resin in amounts as shown in Table 3.

The evaluated results were as shown in Table 4. Since the first polyester resin contained no polyfunctional group, the melt tension was low, and the films oscillated vigorously at 100 m/min. Therefore, the thickness of the coating resin on the laminated member was irregular, and the body walls were broken during the production of the cans.

Comparative Example 7

The procedure was conducted in the same manner as in Example 5 but using the polyfunctional component and the copolymerizable component in the first polyester resin and using the copolymerizable component in the second polyester resin in amounts as shown in Table 3.

The evaluated results were as shown in Table 4. Though the first polyester resin contained the polyfunctional group, the melt tension was low, and the films oscillated vigorously at 100 m/min. Therefore, the thickness of the coating resin on the laminated member was irregular, and the body walls were broken during the production of the cans.

Comparative Examples 8

The procedure was conducted in the same manner as in Example 5 but using the polyfunctional component and the copolymerizable component in the first polyester resin and using the copolymerizable component in the second polyester resin in amounts as shown in Table 3.

The evaluated results were as shown in Table 4. Since the first polyester resin contained the polyfunctional group at a too high concentration, the melt tension was very large, and a ratio of melt tensions of the first polyester resin and of the second polyester resin was very large. Pulsation occurred vigorously at 100 m/min. Therefore, the thickness of the coating resin on the laminated member was irregular, and the body walls were broken during the production of the cans.

Comparative Example 9

The procedure was conducted in the same manner as in Example 5 but using the polyfunctional component and the copolymerizable component in the first polyester resin and using the copolymerizable component in the second polyester resin in amounts as shown in Table 3.

The evaluated results were as shown in Table 4. Though the first polyester resin contained the polyfunctional group, the melt tension was very small, and film oscillated vigorously at 100 m/min. Therefore, the thickness of the coating resin on the laminated member was irregular, and the body walls were broken during the production of the cans.

Comparative Example 10

The procedure was conducted in the same manner as in Example 5 but using the polyfunctional component and the copolymerizable component in the first polyester resin and using the copolymerizable component in the second polyester resin in amounts as shown in Table 3.

The evaluated results were as shown in Table 4. The polyester resin could be favorably applied at a high speed. However, since the first polyester resin contained no copolymerizable component, the films were peeled off and floated during the production of the cans.

Comparative Example 11

The procedure was conducted in the same manner as in Example 5 but using the polyfunctional component and the copolymerizable component in the first polyester resin and using the copolymerizable component in the second polyester resin in amounts as shown in Table 3.

The evaluated results were as shown in Table 4. The polyester resin could be favorably applied at a high speed. However, since the first polyester resin contained the copolymerizable component at a too low concentration, the films were peeled off and floated during the production of the cans.

Comparative Example 12

The procedure was conducted in the same manner as in Example 5 but using the polyfunctional component and the copolymerizable components in the first polyester resin and using the copolymerizable component in the second polyester resin in amounts as shown in Table 3.

The evaluated results were as shown in Table 4. The polyester resin could be favorably laminated at a high speed. However, since the first polyester resin contained the copolymerizable component at a too high concentration, the melting point dropped greatly, the heat resistance was poor, the punch could not be smoothly removed and the buckling occurred during the production of the cans.

Comparative Example 13

The procedure was conducted in the same manner as in Example 5 but using the polyfunctional component and the copolymerizable component in the first polyester resin and using the copolymerizable component in the second polyester resin in amounts as shown in Table 3.

The evaluated results were as shown in Table 4. The films could be laminated at a high speed and the cans could be favorably produced. However, the ultra-pure water became turbid during the retort-treatment in evaluating the flavor-retaining property. This is presumably due to the elution of components from the second polyester resin containing the copolymerizable component at a high concentration. The flavor-retaining property was poor.

TABLE 1

|  | Concentration of polyfunctional component (mol %) | Copolymerizable component | Concentration of copolymerizable component (mol %) | Melting point (° C.) | IV (dl/g) | Melt tension (100 m/min) |
| --- | --- | --- | --- | --- | --- | --- |
| Ex. 1 | 0.04 | isophthalic acid | 12 | 217.5 | 0.95 | 86 |
| Ex. 2 | 0.12 | isophthalic acid | 15 | 210.4 | 0.94 | 212 |
| Ex. 3 | 0.2 | isophthalic acid | 15 | 208.9 | 0.89 | 70 |
| Ex. 4 | 0.43 | isophthalic acid | 12 | 216.9 | 0.84 | 50 |
| Comp. Ex. 1 | 0 | isophthalic acid | 12 | 218.4 | 0.96 | 43 |
| Comp. Ex. 2 | 0.11 | isophthalic acid | 15 | 210.2 | 0.8 | 39 |
| Comp. Ex. 3 | 0.14 | isophthalic acid | 0 | 251.3 | 0.83 | 72 |
| Comp. Ex. 4 | 0.2 | isophthalic acid | 5 | 238.2 | 0.91 | 78 |
| Comp. Ex. 5 | 0.27 | isophthalic acid | 23 | 184.2 | 0.82 | 90 |

TABLE 2

| | High-speed lamination (100 m/min) | | | |
| --- | --- | --- | --- | --- |
| | Film | | Can production aptitude | |
| | oscillation | Pulsation | Workability | Adhesiveness |
| Ex. 1 | ○ | ○ | ○ | ○ |
| Ex. 2 | ○ | ○ | ○ | ○ |
| Ex. 3 | ○ | ○ | ○ | ○ |
| Ex. 4 | ○ | ○ | ○ | ○ |
| Comp. Ex. 1 | X | ○ | X | ○ |
| Comp. Ex. 2 | X | ○ | X | ○ |
| Comp. Ex. 3 | ○ | ○ | ○ | X |
| Comp. Ex. 4 | ○ | ○ | ○ | X |
| Comp. Ex. 5 | ○ | ○ | X | ○ |

TABLE 3

| | First polyester resin | | | | | |
|---|---|---|---|---|---|---|
| | Concentration of polyfunctional component (mol %) | Copolymerizable component | Concentration of copolymerizable component (mol %) | Melting point (° C.) | IV (dl/g) | Melt tension (100 m/min) [mN] |
| Ex. 5 | 0.04 | isophthalic acid | 12 | 217.5 | 0.95 | 86 |
| Ex. 6 | 0.12 | isophthalic acid | 15 | 210.4 | 0.94 | 212 |
| Ex. 7 | 0.20 | isophthalic acid | 15 | 208.9 | 0.89 | 70 |
| Ex. 8 | 0.43 | isophthalic acid | 12 | 216.9 | 0.84 | 50 |
| Comp. Ex. 6 | 0 | isophthalic acid | 12 | 218.4 | 0.96 | 43 |
| Comp. Ex. 7 | 0.11 | isophthalic acid | 15 | 210.2 | 0.80 | 39 |
| Comp. Ex. 8 | 0.53 | isophthalic acid | 12 | 218.9 | 0.90 | 2780 |
| Comp. Ex. 9 | 0.11 | isophthalic acid | 15 | 209.8 | 0.71 | 11 |
| Comp. Ex. 10 | 0.14 | isophthalic acid | 0 | 251.3 | 0.83 | 72 |
| Comp. Ex. 11 | 0.20 | isophthalic acid | 5 | 238.2 | 0.91 | 78 |
| Comp. Ex. 12 | 0.27 | isophthalic acid | 23 | 184.2 | 0.82 | 90 |
| Comp. Ex. 13 | 0.22 | isophthalic acid | 12 | 219.1 | 0.87 | 55 |

| | Second polyester resin | | | | | | |
|---|---|---|---|---|---|---|---|
| | Copolymerizable component | Concentration of copolymerizable component (mol %) | Melting point (° C.) | IV (dl/g) | Melt tension (100 m/min) [mN] | Melt tension ratio | Thickness ratio |
| Ex. 5 | isophthalic acid | 5 | 238.2 | 0.89 | 43 | 2.0:1 | 4:1 |
| Ex. 6 | isophthalic acid | 5 | 238.2 | 0.89 | 43 | 4.9:1 | 4:1 |
| Ex. 7 | isophthalic acid | 15 | 207.9 | 0.91 | 21 | 3.3:1 | 4:1 |
| Ex. 8 | isophthalic acid | 5 | 238.2 | 0.89 | 43 | 1.2:1 | 4:1 |
| Comp. Ex. 6 | isophthalic acid | 5 | 238.2 | 0.89 | 43 | 1.0:1 | 4:1 |
| Comp. Ex. 7 | isophthalic acid | 5 | 238.2 | 0.89 | 43 | 0.9:1 | 4:1 |
| Comp. Ex. 8 | isophthalic acid | 5 | 238.2 | 0.89 | 43 | 65:1 | 4:1 |
| Comp. Ex. 9 | isophthalic acid | 5 | 238.2 | 0.89 | 43 | 0.3:1 | 4:1 |
| Comp. Ex. 10 | isophthalic acid | 5 | 238.2 | 0.89 | 43 | 1.7:1 | 4:1 |
| Comp. Ex. 11 | isophthalic acid | 10 | 223.5 | 0.90 | 33 | 2.4:1 | 4:1 |
| Comp. Ex. 12 | isophthalic acid | 5 | 238.2 | 0.89 | 43 | 2.1:1 | 4:1 |
| Comp. Ex. 13 | isophthalic acid | 22 | 184.4 | 0.88 | 12 | 4.6:1 | 4:1 |

TABLE 4

| | High-speed lamination (100 m/min) | | Can production aptitude | | Flavor-retaining property |
|---|---|---|---|---|---|
| | Film oscillation | Pulsation | Workability | Adhesiveness | |
| Ex. 5 | ○ | ○ | ○ | ○ | ○ |
| Ex. 6 | ○ | ○ | ○ | ○ | ○ |
| Ex. 7 | ○ | ○ | ○ | ○ | ○ |
| Ex. 8 | ○ | ○ | ○ | ○ | ○ |
| Comp. Ex. 6 | X | ○ | X | ○ | — |
| Comp. Ex. 7 | X | ○ | X | ○ | — |
| Comp. Ex. 8 | ○ | X | X | ○ | — |
| Comp. Ex. 9 | X | ○ | X | ○ | — |
| Comp. Ex. 10 | ○ | ○ | ○ | X | — |
| Comp. Ex. 11 | ○ | ○ | ○ | X | — |
| Comp. Ex. 12 | ○ | ○ | X | ○ | — |
| Comp. Ex. 13 | ○ | ○ | ○ | ○ | X |

The invention claimed is:

1. A film for lamination comprising a layer of a first polyester resin containing a polyfunctional component in an amount of 0.01 to 0.50 mol % and having a melt tension of not smaller than 50 mN and a layer of a second polyester resin laminated thereon, wherein said first polyester resin has a melt tension larger than a melt tension of said second polyester resin.

2. A film for lamination according to claim 1, wherein said first polyester resin is a copolymerized polyester resin comprising chiefly a polyethylene terephthalate unit which contains a copolymerizable component in an amount of 10 to 20 mol %.

3. A film for lamination according to claim 2, wherein said copolymerizable component is an isophthalic acid.

4. A film for lamination according to claim 3, wherein said copolymerized polyester resin has a melting point of tower than 220° C.

5. A film for lamination according to claim 1, wherein a ratio of the melt tensions of said first polyester resin and of said second polyester resin is 1.1:1 to 5:1.

6. A film for lamination according to claim 1, wherein a ratio of the thicknesses of said first polyester resin and of said second polyester resin is 50:1 to 1:5.

7. A laminated member obtained by laminating the film for lamination of claim 1 on a metal substrate so as to come in contact therewith.

8. A film for lamination obtained by laminating the film for lamination of claim 1 on a metal substrate in a manner that the layer of the first polyester resin comes in contact with said metal substrate.

* * * * *